(12) United States Patent
Arakawa et al.

(10) Patent No.: US 7,522,151 B2
(45) Date of Patent: Apr. 21, 2009

(54) COORDINATE-BASED DISPLAY OBJECT MOVEMENT RESTRICTION METHOD

(75) Inventors: Kazuya Arakawa, Tochigi (JP); Toshinori Furuhashi, Tochigi (JP); Shigeru Kojima, Tochigi (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 293 days.

(21) Appl. No.: 10/525,070

(22) PCT Filed: Aug. 1, 2003

(86) PCT No.: PCT/JP03/09813

§ 371 (c)(1),
(2), (4) Date: Feb. 18, 2005

(87) PCT Pub. No.: WO2004/019199

PCT Pub. Date: Mar. 4, 2004

(65) Prior Publication Data

US 2006/0001644 A1 Jan. 5, 2006

(30) Foreign Application Priority Data

Aug. 21, 2002 (JP) ............................. 2002-240232

(51) Int. Cl.
*G06F 3/033* (2006.01)
(52) U.S. Cl. ....................... 345/156; 715/764
(58) Field of Classification Search ................ 345/156, 345/157, 159, 160; 715/856–862, 764
See application file for complete search history.

(56) References Cited

U.S. PATENT DOCUMENTS 5,333,247 A * 7/1994 Gest et al. .................... 345/672
5,565,887 A * 10/1996 McCambridge et al. ...... 715/856
5,850,213 A * 12/1998 Imai et al. .................... 428/1.55
2001/0048423 A1* 12/2001 Rekimoto .................... 345/157

FOREIGN PATENT DOCUMENTS

| JP | 5-80925 A | 4/1993 |
| JP | 5-130750 A | 5/1993 |
| JP | 5-181603 A | 7/1993 |
| JP | 5-210461 A | 8/1993 |
| JP | 6-301479 A | 10/1994 |
| JP | 11-39090 A | 2/1999 |
| JP | 2001-110582 A | 4/2001 |
| JP | 2001-188626 A | 7/2001 |
| JP | 2002-123226 A | 4/2002 |

* cited by examiner

*Primary Examiner*—Chanh Nguyen
*Assistant Examiner*—Pegeman Karimi
(74) *Attorney, Agent, or Firm*—Birch, Stewart, Kolasch & Birch, LLP

(57) ABSTRACT

A component in a horizontal direction (the x-axis component) of a movement amount first acquired after a pointing device is reset and a component in a vertical direction (the y-axis component) are compared, a movement input is regarded as provided only in the horizontal direction in case the absolute value of the x-axis component is larger than the absolute value of the y-axis component, a movement input is regarded as provided only in the vertical direction in case the absolute value of the y-axis component is larger than the absolute value of the x-axis component, a movement input is regarded as provided in the same direction unless the ratio of components of movement inputs is greatly changed subsequently, and continuous movement inputs in the same direction are facilitated.

14 Claims, 2 Drawing Sheets

COORDINATE-BASED DISPLAY OBJECT MOVEMENT RESTRICTION METHOD

TECHNICAL FIELD

The present invention relates to a pointing device using a gyrosensor and a display device for presentation using a projection type image display device such as a liquid crystal projector.

BACKGROUND ART

Recently, cases that an image by a computer and a dynamic image are displayed using a projection type image display device such as a liquid crystal projector and effective presentation is made using a pointing device increase, and a device that utilizes a gyrosensor for the pointing device is proposed. The pointing device utilizing the gyrosensor moves the body to a specific direction, samples the information of relative positions before and after the movement every fixed time, and transmits the relative positional information to the display device. The display device moves a selected position of a menu item included in a main menu on the screen based upon the received relative positional information, moves and the cursor and a point, pans and moves a picture in a picture.

DISCLOSURE OF THE INVENTION

However, in the pointing device using the gyrosensor according to these prior art, as the inclination of the body of the pointing device using the gyrosensor is detected as linear movement in a direction according to the inclination, the pointing device has a defect that an operation for continuously advancing directly in a direction of the x-axis or in a direction of the y-axis on a display screen is difficult, a component in the other direction is mixed without fail and movement to be direct curves.

The pointing device also has a problem that it takes much time to determine a direction because the direction is not determined until a predetermined value is acquired by using a method of determining either of the x-axis or the y-axis on which the whole movement amount reaches the predetermined value earlier as a motional direction, resetting when the direction is determined and repeating it.

Then, to solve the problem, the invention is based upon a display device for presentation formed by a pointing device provided with means for detecting angular velocity in a horizontal direction and in a vertical direction and means for transmitting the detected angular velocity information and an image display device provided with receiving means for receiving the angular velocity information transmitted from the pointing device and a function for moving an image such as a cursor and a point displayed on a screen according to a movement amount acquired by sampling the received angular velocity information, and is characterized in that means for comparing a component in the horizontal direction (the x-axis component) of a movement amount first acquired and a component in the vertical direction (the y-axis component) after the pointing device is reset, judging that a movement input is provided only in the horizontal direction in case the absolute value of the x-axis component is larger than the absolute value of the y-axis component and judging that a movement input is provided only in the vertical direction in case the absolute value of the y-axis component is larger than the absolute value of the x-axis component, means for judging that a movement input is continuously provided only in the horizontal direction in case the coordinates of a movement amount input next or subsequently after the movement input is provided only in the horizontal direction are located in leading-in areas encircled by straight lines y=ax and y=−ax (a>1) having the x-axis between them and judging that a movement input is provided only in the vertical direction in case the coordinates are located outside the above-mentioned areas and means for judging that a movement input is continuously provided only in the vertical direction in case the coordinates of a movement amount input next or subsequently after the movement input is provided only in the vertical direction are located in leading-in areas encircled by straight lines y=x/a and y=−x/a having the y-axis between them and judging that a movement input is provided only in the horizontal direction in case the coordinates are located outside the above-mentioned areas are provided.

Further, the invention is based upon the above-mentioned device, and is characterized in that means for monitoring a calculated value of a movement amount while a movement amount is provided only in a horizontal direction or in a vertical direction is provided and means for changing the inclination a of straight lines in case a component in the horizontal direction of a movement amount or a component in the vertical direction increases or decreases by fixed width is provided.

Besides, the invention is based upon the above-mentioned device and is characterized in that means for monitoring a calculated value of a movement amount while a movement input is provided only in a horizontal direction and judging that a movement input is provided only in a vertical direction in case the absolute value of a component in the horizontal direction of a movement amount decreases by fixed width and the absolute value of a component in the vertical direction decreases by fixed width and means for monitoring a calculated value of a movement amount while a movement input is provided only in the vertical direction and judging that a movement input is provided only in the horizontal direction in case the absolute value of the component in the vertical direction of the movement amount decreases by fixed width and the component in the horizontal direction decreases by fixed width are provided.

BEST MODE FOR CARRYING OUT THE INVENTION

Figure 1:
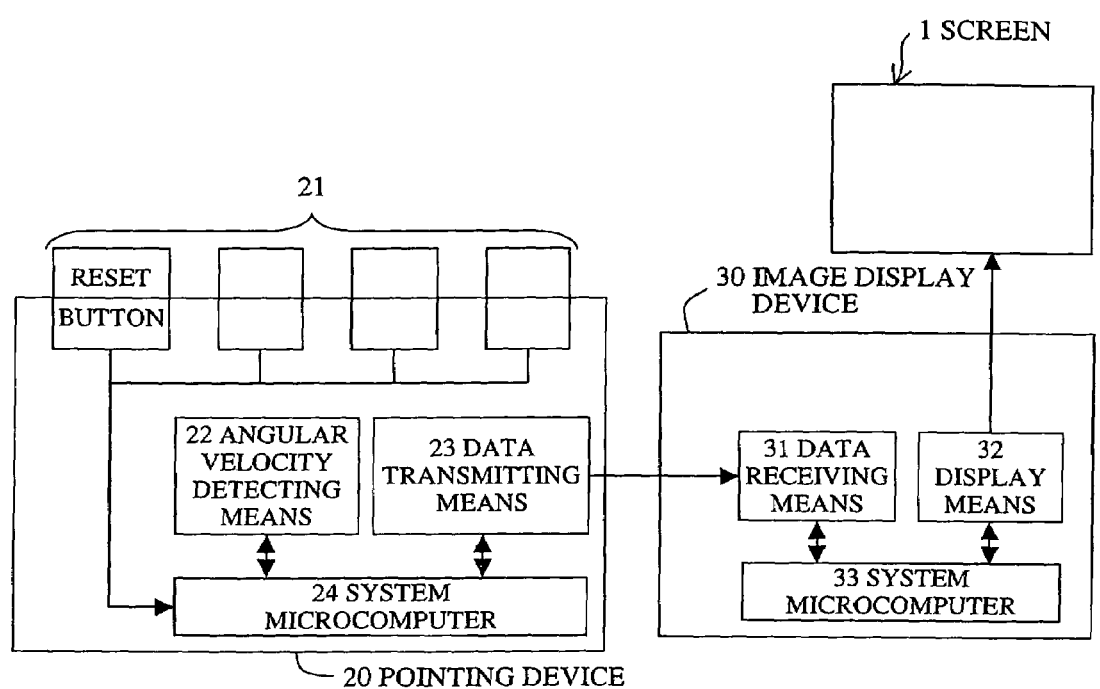
FIG. 1 is a block diagram showing the configuration of the invention.

Referring to the drawings, an embodiment of the invention will be described below.

FIG. 1 is a block diagram showing the configuration of a display device for presentation according to the invention. As shown in FIG. 1, a reference number 1 denotes a screen. A reference number 20 denotes a pointing device and the pointing device is formed by a group of buttons 21 such as reset buttons, angular velocity detecting means 22, data transmitting means 23 and a pointing device system microcomputer 24. A reference number 30 denotes an image display device and the image display device is formed by data receiving means 31, display means 32 and an image display device system microcomputer 33.

In the angular velocity detecting means 22, each velocity sensor such as a gyrosensor is built, converts three-dimensional information to two-dimensional information in a horizontal direction and in a vertical direction, reads (samples)

relative positional information before and after movement every fixed time, and detects relative positions before and after the movement.

The pointing device system microcomputer 24 controls the whole pointing device 20, discriminates detected relative positional information, and the information is transmitted from the data transmitting means 23 to the data receiving means 31 by wireless. The display device for presentation is formed by these, a computer image not shown is projected onto the screen 1 from the image display device 30, and various display and operations are performed based upon the image using the pointing device 20.

Figure 2:
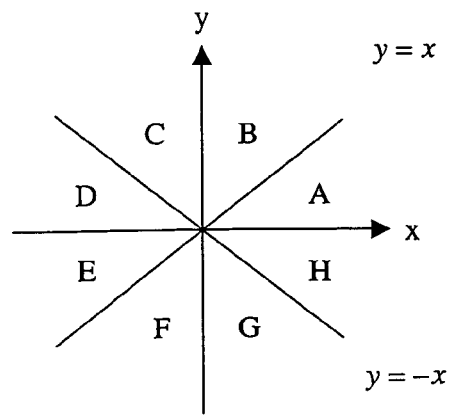
FIGS. 2A to 2C are graphs for explaining the invention.
Figure 2:
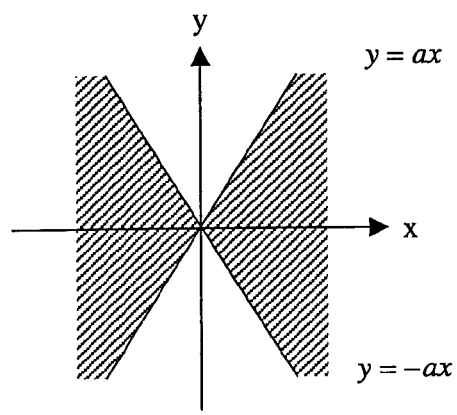
Figure 2:
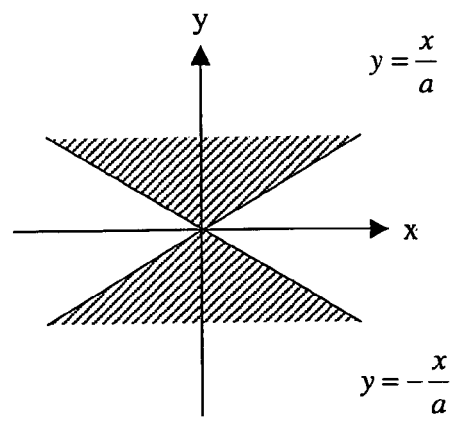

FIGS. 2A to 2C are graphs for explaining the invention. As in the embodiment of the above-mentioned each invention, the movement on the screen was often made either in the horizontal direction or in the vertical direction, an operation either for the horizontal direction or for the vertical direction was required to be continuously executed in case the pointing device 20 was operated. Then, in the invention, after the pointing device 20 is reset by pressing its reset button 21, the absolute value of a component in a horizontal direction (the x-axis component) of a movement amount acquired based upon relative positional information initially input and the absolute value of a component in a vertical direction (the y-axis component) are compared, in case the absolute value of the x-axis component is larger than the absolute value of the y-axis component, a movement input is regarded as provided only in the horizontal direction, and in case the absolute value of the y-axis component is larger than the absolute value of the x-axis component, a movement input is regarded as provided only in the vertical direction. That is, in case an acquired movement amount is plotted in the graph shown in FIG. 2A and the coordinates of the movement amount are located in leading-in areas (A, H, D, E) encircled by straight lines $y=x$ and $y=-x$ having the x-axis between them, a movement input is regarded as provided only in the horizontal direction and no input is regarded as provided in the vertical direction. In areas (B, C, F, G) except the above-mentioned leading-in areas, a movement input is regarded as provided only in the vertical direction and no input is regarded as provided in the horizontal direction.

Further, a movement amount next acquired will be referred. That is, in case the coordinates of a movement amount input next or subsequently are located in leading-in areas (slant line areas shown in FIG. 2B) encircled by straight lines $y=ax$ and $y=-ax$ ($a>1$) having the x-axis between them after a movement input is provided only in the horizontal direction, a movement input is regarded as continuously provided only in the horizontal direction, and when the coordinates are located outside the above-mentioned areas, the movement input is regarded as changed to a movement input in only the vertical direction.

Similarly, in case the coordinates of a movement amount input next or subsequently are located in leading-in areas (slant line areas shown in FIG. 2C) encircled by straight lines $y=x/a$ and $y=-x/a$ having the y-axis between them after a movement input is provided only in the vertical direction, a movement input is regarded as continuously provided only in the vertical direction, and when the coordinates are located outside the above-mentioned areas, the movement input is regarded as changed to a movement input in only the horizontal direction.

In this case, as a movement input is regarded as provided either in the vertical direction or in the horizontal direction as a result of comparison between the components of a movement amount when relative positional information is first detected and the movement amount is acquired and subsequent movement is regarded as continuous movement in only the former direction even if the component in the other direction slightly surpasses, movement either in the vertical direction or in the horizontal direction can be continuously input even if a direction is slightly changed only by taking care of a first direction when the pointing device 20 is operated and the operability is enhanced.

In case the leading-in area is converted, for example, in case traveling speed in the horizontal direction decreases and a component in the vertical direction is detected in conversion from the leading-in area in the horizontal direction to the leading-in area in the vertical direction, it is desirable that the leading-in area is immediately converted.

That is, in case a calculated value of a movement amount is monitored while a movement input is provided only in the horizontal direction, a component in the horizontal direction of the movement amount decreases by fixed width (by a fixed value) and a component in the vertical direction is detected, a movement input is regarded as provided only in the vertical direction. Similarly, in case a calculated value of a movement amount is monitored while a movement input is provided only in the vertical direction, a component in the vertical direction of the movement amount decreases by fixed width (by a fixed value) and a component in the horizontal direction is detected, a movement input is regarded as provided only in the horizontal direction. Concretely, when the movement of the pointing device is moderated so as to change the direction of movement to the other direction while a movement input is provided in the same direction on the x-axis or on the y-axis by the operation of the pointing device 20, the movement in the current direction is immediately switched to movement in the other direction.

In other words, in the invention, a calculated value of a movement amount is monitored while a movement input is provided only in the horizontal direction or in the vertical direction and in case a component in the horizontal direction of a movement amount or a component in the vertical direction increases or decreases by fixed width (by a fixed value), a leading-in area can be converted by changing the inclination a of a straight line.

INDUSTRIAL APPLICABILITY

As described above, according to the invention, a movement input in the same direction is facilitated by comparing a component in the horizontal direction (the x-axis component) of a movement amount first acquired and a component in the vertical direction (the y-axis component) after the pointing device is reset, regarding a movement input as provided only in the horizontal direction in case the absolute value of the x-axis component is larger than the absolute value of the y-axis component, regarding a movement input as provided only in the vertical direction in case the absolute value of the y-axis component is larger than the absolute value of the x-axis component and regarding a movement input as provided in the same direction unless the ratio of components of movement inputs is greatly changed subsequently, and the operability is enhanced.

Besides, when the movement of the pointing device is moderated so as to change the direction of movement to the other direction while the movement in the same direction on the x-axis or on the y-axis is input by the operation of the pointing device, the movement in the current direction is immediately switched to the movement in the other direction and the operability is enhanced.

Other embodiments of the present invention may include a display system composed of a pointing device with means for detecting motion in two directions, such as x and y, and a display device with means for acquiring the detected motion from the pointing device. The system may also contain a controller that moves a pointer or other display object based upon the acquired motion information.

Determining a direction of motion may entail comparing the absolute value of a component in the x direction and the absolute value of a component m the y direction and selecting the larger of the two as the direction of motion.

This embodiment of the system may also contain a means for expanding the size of a leading-in area covering a direction of motion as continuous motion is detected in that direction and also for changing between a leading-in area for the x-direction (FIG. 2B) and a leading-in area for the y-direction (FIG. 2C) as the x and y component makeup of the detected motion changes.

The established leading-in area is used to 'smooth out' detected motion into motion in only one direction, in this case only horizontal or vertical motion, based on the coordinates of the motion. If the coordinates of a motion lie within the currently established leading-in area, then motion is determined to be in the direction covered by the leading-in area. If the coordinates of a motion lie outside the currently established leading-in area, then motion is determined to be in the direction not covered by the leading in area. For example, if the x-direction leading in area is the currently established leading-in area, a motion having coordinates within the leading-in area would be interpreted as only horizontal motion while a motion having coordinates outside the leading-in area would be interpreted as only vertical motion.

The invention being thus described, it will be obvious That the same may be varied in many ways. Such variations are not to be regarded as departure from the spirit and scope of the invention, and all such modifications as would be obvious to one skilled in the art are intended to be included within the scope of the following claims.

The invention claimed is:

1. A method for translating input motion information into movement of a display object comprising:
    establishing a direction-specific leading-in area based on an initial motion direction in a first direction obtained from input motion information,
    determining a direction of motion after the initial motion direction by evaluating whether subsequent coordinates of an input motion fall within the direction-specific leading-in area established by the initial motion direction,
    switching the direction-specific leading-in area of the first direction for a direction-specific leading-in area of a second direction in response to changes in the amount of motion input in the first direction and the amount of motion input in the second direction, and
    altering a shape of the established direction-specific leading-in area in response to continuous motion input in the first direction; wherein
    the motion component in the first direction being in the x direction of a coordinate system and the motion component in the second direction being in the y direction of a coordinate system; and
    the direction-specific leading-in area for the x direction comprising an area along the x-axis bounded by lines $y=ax$ and $y=-ax$ where 'a' is a number greater than 1 and the direction-specific leading-in area for the y direction comprising an area along the y-axis bounded by lines $y=x/a$ and $y=x/(-a)$ where 'a' is number greater than 1, and further wherein said altering a shape comprises increasing or decreasing the value of 'a'.

2. The method of claim 1, wherein the display object comprises a pointer.

3. The method of claim 1, said establishing step comprising:
    determining an initial motion direction by comparing the absolute value of an initial motion component in the first direction and the absolute value of an initial motion component in the second direction and taking the initial motion direction to be the component with the greater absolute value; and
    establishing a direction-specific leading-in area along the axis of the initial direction of motion.

4. The method of claim 1, said altering step further comprising:
    altering a shape of a direction-specific leading-in area of the second direction in response to continuous motion input in the second direction after a switching step occurs.

5. The method of claim 1, said determining step comprising:
    determining that input motion is translated as motion only in the direction covered by the currently established direction-specific leading-in area if the coordinates of the motion fall within the leading-in area defined for the direction covered by the currently established direction-specific leading-in area, or as motion only in the direction not covered by the leading-in area if the coordinates of the motion fall outside the leading-in area defined for the direction covered by the currently established direction-specific leading-in area.

6. The method of claim 5, further comprising:
    setting the value of 'a' to an initial value; and
    increasing the value of 'a' while subsequent coordinates of input motion continue to fall within the currently established direction-specific leading-in area.

7. The method of claim 6, further comprising:
    clearing prior memory of detected motion from the system by setting the value of 'a' to an initial value and reverting to a state where a direction-specific leading-in area has not yet been established.

8. The method of claim 1, said switching step further comprising:
    converting the direction-specific leading-in area of the first direction into a direction-specific leading-in area of the second direction when the absolute value of motion in the first direction decreases by a threshold amount and there is motion in the second direction.

9. The method of claim 1, said switching step further comprising:
    converting the direction-specific leading-in area of the first direction into a direction-specific leading-in area of the second direction when the absolute value of motion in the second direction increases by a threshold amount and the absolute value of motion in the first direction does not increase.

10. The method of claim 1 further comprising clearing prior memory of motion input from the system in response to user input.

11. The method of claim 1, the input motion information further comprising two-dimensional motion information in a three-dimensional motion environment.

12. The method of claim 1, the input motion information further comprising angular velocity information created by moving a pointing device in a direction.

13. A method for translating input motion information into movement of a display object comprising:

establishing a direction-specific leading-in area based on an initial motion direction in a first direction obtained from input motion information, determining a direction of motion after the initial motion direction by evaluating whether subsequent coordinates of an input motion fall within the direction-specific leading-in area established by the initial motion direction, switching the direction-specific leading-in area of the first direction for a direction-specific leading-in area of a second direction in response to changes in the amount of motion input in the first direction and the amount of motion input in the second direction, and altering a shape of the established direction-specific leading-in area in response to continuous motion input in the first direction; wherein, the motion component in the first direction being in the y direction of a coordinate system and the motion component in the second direction being in the x direction of a coordinate system; and the direction-specific leading-in area for the x direction comprising an area along the x-axis bounded by lines y=ax and y=−ax where 'a' is a number greater than 1 and the direction-specific leading-in area for the y direction comprising an area along the y-axis bounded by lines y=x/a and y=x/(−a) where a is number greater than 1, and further wherein said altering a shape comprises increasing or decreasing the value of 'a'.

14. A method for translating input motion information into movement of a display object comprising:

establishing a direction-specific leading-in area based on input motion information by determining an initial direction of motion by comparing the absolute value of an initial input motion component in the x direction and the absolute value of an initial input motion component in the y direction and taking the initial direction of motion to be the direction whose component has a greater absolute value and establishing a direction-specific leading-in area along the axis of the initial direction of motion;

determining, if the established direction-specific leading-in area is for the x direction, that input motion information having an x component and a y component is translated as motion only of the x component if the coordinates of the motion fall within the leading-in area defined for the x direction, and determining that input motion information having an x component and a y component is translated as motion exclusively of the y component if the coordinates of the motion fall outside the leading-in area defined for the x direction, where the direction specific leading-in area for the x direction comprises an area along the x-axis bounded by lines y=ax and y=−ax where 'a' is a number greater than 1, and determining, if the established direction-specific leading-in area is for the y direction, that input motion information having an x component and a y component is translated as motion only of the y component if the coordinates of the motion fall within the leading-in area defined for the y direction, and determining that input motion information having an x component and a y component is translated as motion exclusively of the x component if the coordinates of the motion fall outside the leading-in area defined for the y direction, where the direction-specific leading-in area for the y direction comprises an area along the y-axis bounded by lines y=x/a and y=x/(−a) where a is number greater than 1;

switching the direction-specific leading-in area of the x direction for the direction-specific leading-in area of the y direction when the absolute value of detected motion in the x direction decreases by a threshold amount and motion in the y direction is detected, or when the absolute value of detected motion in the y direction increases by a threshold amount and the absolute value of detected motion in the x direction does not increase by changing the boundaries of the leading in area from an area along the x-axis bounded by the lines y=ax and y=−ax to an area along the y-axis bounded by the lines y=x/a and y=x/(−a), and switching the direction-specific leading-in area of the y direction for the direction-specific leading-in area of the x direction when the absolute value of detected motion in the y direction decreases by a threshold amount and motion in the x direction is detected, or when the absolute value of detected motion in the x direction increases by a threshold amount and the absolute value of detected motion in the y direction does not increase by changing the boundaries of the leading-in area from an area along the y-axis bounded by the lines y=x/a and y=x/(−a) to an area along the x-axis bounded by the lines y=ax and y=−ax, and setting the value of 'a' to an initial value each time a conversion between horizontal and vertical leading-in areas occurs;

altering a shape of the established direction-specific leading-in area in response to continuous motion input in a direction by increasing the value of 'a' while subsequent coordinates of motion inputs continue to fall within the currently established direction-specific leading-in area; and clearing prior memory of detected motion from the system by setting the value of 'a' to an initial value and reverting to a state where a direction-specific leading-in area has not yet been established.

* * * * *